E. L. CLARK.
BATTERY TESTER.
APPLICATION FILED APR. 26, 1913.
1,148,218.
Patented July 27, 1915.
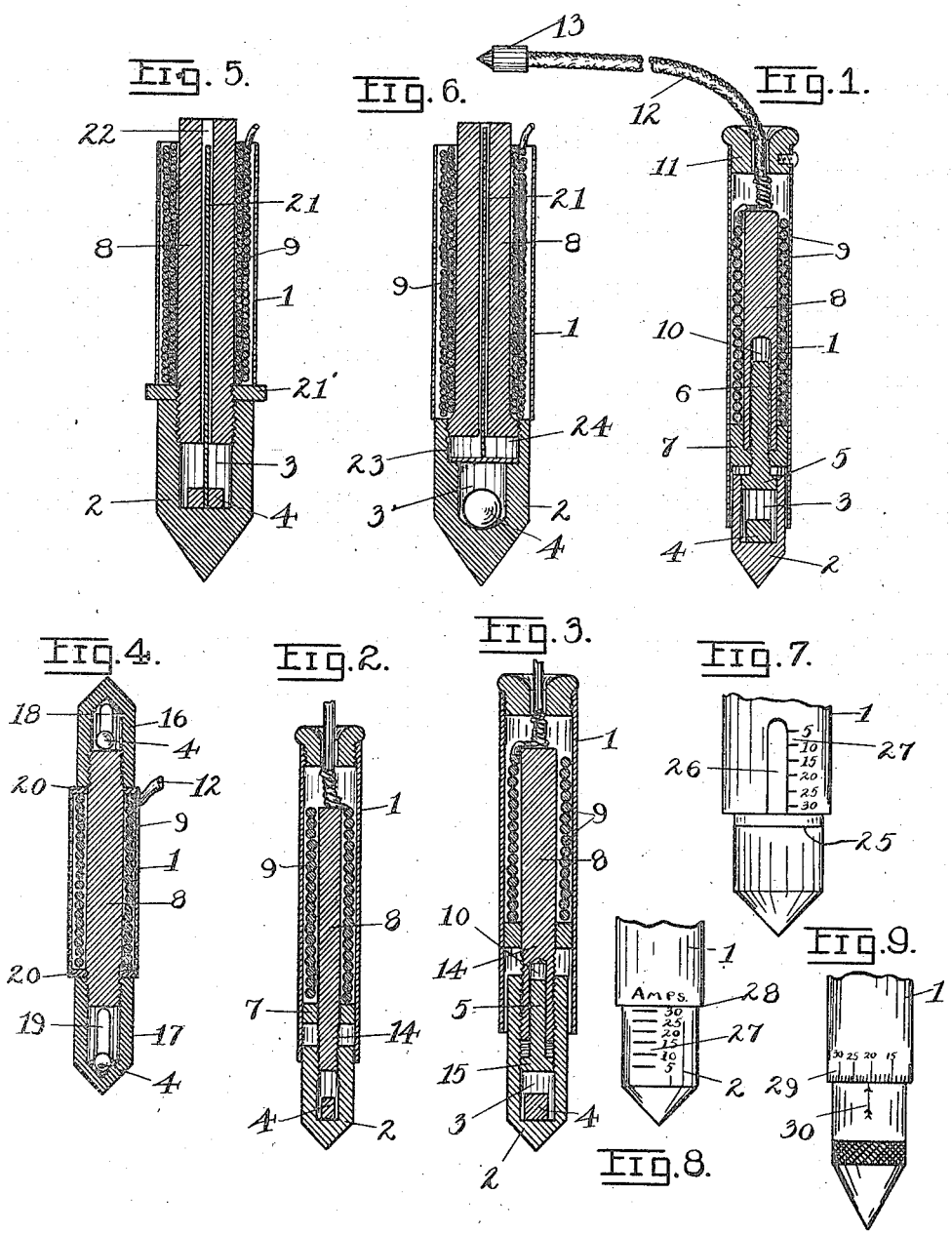
WITNESSES
D. Brewer
H. G. Grover
INVENTOR
EMERSON L. CLARK
BY Ira J. Adams
ATTORNEY

UNITED STATES PATENT OFFICE.

EMERSON L. CLARK, OF LAKEWOOD, OHIO, ASSIGNOR TO NATIONAL CARBON COMPANY, OF CLEVELAND, OHIO, A CORPORATION OF NEW JERSEY.

BATTERY-TESTER.

1,148,218.   Specification of Letters Patent.   Patented July 27, 1915.

Application filed April 26, 1913.   Serial No. 763,715.

*To all whom it may concern:*

Be it known that I, EMERSON L. CLARK, a citizen of the United States, residing at Lakewood, in the county of Cuyahoga and State of Ohio, have invented a certain new and useful Improvement in Battery-Testers, of which the following is a full, clear, and exact description.

This invention relates to a device for testing batteries, and is adapted particularly to be used in connection with dry cells.

One object of this invention is to construct a reliable battery tester of new design at low cost.

Another object is to secure an instrument which will indicate if a battery is up to a certain definite standard by means of an audible signal or by the sense of touch.

A further object is to provide an instrument that is adjustable and which will not operate below a definite value.

Other objects will appear in the appended description in which:

Figure 1 is a cross sectional view of the preferred form of my testing device. Fig. 2 is a cross section of a modification slightly different than that shown in Fig. 1. Fig. 3 is a cross sectional view of another modification of the instrument shown in Fig. 1. Fig. 4 is also a cross sectional view of a type of battery tester having a visual indicator. Fig. 5 is a cross section of a modified form which indicates to the sense of touch the condition of the battery. Fig. 6 is a cross section of a device similar to that shown in Fig. 5. Fig. 7 is a partial view showing a suitable scale for indicating the adjustment. Fig. 8 is another type of scale for use on the battery testers shown. Fig. 9 is a somewhat different scale for use similar to those of Figs. 7 and 8.

Referring to the preferred form as shown in Fig. 1, the tester consists of a cylindrical inclosing tube 1 formed preferably of some non-magnetic conducting metal such as brass, and of small diameter, say about $\frac{3}{8}''$ to $\frac{1}{4}''$, so that the instrument can be conveniently carried in the pocket. Within the tube the elements of the tester are placed as hereinafter described. A hollow contact or terminal 2 made of non-magnetic conducting material has a chamber or recess 3 therein and a soft iron plunger or armature 4 is placed in the chamber. The upper or open end is then closed by means of the head 5 which has a "force fit" in the contact member 2. When these members are thus arranged, the threaded portion 6 of the bolt is fitted into the supporting washer or cap 7 which is preferably made of a non-magnetic material, and is tightly fitted into the inclosing tube. A magnetic core 8 having a central hole 10 fits into cap 7 and a coil 9 is wound thereon. The threaded portion 6 of the bolt fits loosely in the hole 10 and screws through the hole in the lower portion of the cap which is threaded to receive it. One end of the winding is fastened to the supporting washer 7 so that the member 2 forms one terminal of the instrument and the other end is brought out through a hole in the cap 11 to form the second terminal. A convenient contact 13 is fitted to the end of the flexible lead 12 and may be made in any desirable length.

In the modification shown in Fig. 2 the similar parts are designated by the same reference characters as used in the description of Fig. 1. The manner in which this device differs from the tester shown in the preceding figure is in the adjustment of the terminal by means of the threaded portion 14 on the core 8.

The device shown in Fig. 3 is a combination of the features set forth in Figs. 1 and 2. Threaded end 14 of the core 8 is adjustable in the contact 2 as in Fig. 2. The core is also hollow as in Fig. 1 and the member 5 is adjustable therein by means of threads on the core 8 and in the chamber 3. The edge of the head is threaded at 15 so as to be adjusted in the chamber of the contact member while the projection 5 slides loosely in the hole 10.

Two indicators are placed upon a single core in Fig. 4 by fastening a hollow terminal to each end and by slotting it, the plungers are made visible. The coil 9 is wound around the core 8, and hollow contact pieces 16 and 17 having slots or openings 18 and 19 therein are placed so as to permit the position of the armatures 4 to be observed. The length of the chamber in the contacts on each end is different so that the device may be used to test batteries for different current values. This result might also be accomplished by making the armatures 4 of different size. At each end of the inclosing tube, the non-magnetic washers 20 are fitted around the core to completely inclose the winding.

The modification of Fig. 5 is constructed substantially the same as in each of the preceding instruments, but in order to secure an instrument which gives a touch signal instead of an audible one, a pin 21 is attached to the plunger 4. This pin passes through a small hole 22 longitudinally placed in the core so that when the core is raised, the pin 21 touches the finger placed over the opening. The adjustment between the core 8 and contact 2 can be secured by adding non-magnetic washer 21'.

The instrument shown in Fig. 6 is of the same type as that of Fig. 5, the difference being in the manner of operating the pin. The lower end of the pin 21 which is preferably of non-magnetic material is attached to the head 23 moving loosely in a recess 24 of a larger diameter than the lower recess 3 in which the armature 4 operates. The opening 24 is closed by the threaded end of the magnet 8 as in the preceding figure.

Figs. 7, 8 and 9 illustrate three typical scales for indicating the current required to operate the instrument. In the form shown in Fig. 7, the indicator 25 is a circular line or groove cut around the contact member 2. This guide line is visible through a slot 26 cut in the cylinder 1, and a longitudinal scale 27 is marked on the cylinder at the edge of the slot. The scale may be calibrated to indicate the point at which the magnet picks up for various currents. In Fig. 8 the scale 27 is marked on the contact member 2 and the base line 28 of the tube serves as the zero line. In Fig. 9, the scale 29 is marked around the lower edge of the inclosing cylinder, and an arrow 30 serves as the zero line. This form of scale is adapted for instruments in which the vertical distance through which the contact 2 is moved for a given variation of current is small. Each of these forms can be used in any of the preceding battery testers, and other forms will also be suitable, those shown being merely illustrative.

The operation of all the types of instruments is essentially similar as is also the manner of adjusting. In Fig. 1, when the terminals 2 and 13 are applied to the terminals of a battery, the coil 9 will magnetize the core 8. The path of the magnetic flux is then through the small contact points and air gaps between the threads of the bolt 6 and the hollow core 8. If the flux created in the core by the passage of the current through the coil is of correct value, the armature 4 will be lifted quickly. This will produce a sharp click by the impact against the pole piece 5. This gives an audible signal indicating that the battery can give a strong enough current to pick up the armature. By adjusting the bolt 6 outward through the washer 7, the reluctance of the magnetic circuit is increased by decreasing the area of the contact between the core and pole piece 6. The amount of the current necessary to create sufficient flux to raise the armature is then greater, so that by altering the position of the contact 2, the value at which the armature is picked up will be changed. The operator in testing a battery would adjust the contact piece from high readings to lower ones until the click indicates that the armature has been picked up. The value of the current can then be read on the scale. This value is the current that the battery can produce on short circuit for the winding on the coil can be made to have negligible resistance. The tester can also be wound to take a small current and by proper calibration it will indicate the voltage.

In Figs. 1, 2 and 3, the tester is designed to produce a click when the current traversing it exceeds a predetermined value. If desired, the tester can be permanently set for any value, and if on short circuiting a battery through it, the plunger does not rise to produce a click, the operator will know that the battery has deteriorated to such an extent that it should be removed. If it is desired to know just how much current the defective battery will produce, this can be determined by adjusting the contact piece until the armature picks up as evidenced by the click. The scale reading will then indicate the current that the battery gives.

In Fig. 4, the tester gives an indication of the current traversing it by both audible and visible means. The ball will produce a click when it is drawn up against the core, and the position of the ball can be seen through the slots in the contact piece.

In Figs. 5 and 6, the impact in the ball or plunger can be both heard and felt. The operator by placing his finger over the upper end of the tester will feel the impact through the pin in the core. In these two modifications, if the armature sticks to the core on account of residual magnetism, it can be pushed away by manipulating the pin.

In all of the battery testers shown, the shape of the armature and inclosing tube is, of course, immaterial, and likewise the type of indicating scale.

Having described my invention, what I claim is:

1. In a battery tester, an iron core, a contact piece secured thereto having a chamber, a coil around the core having one terminal connected to the contact piece and a plunger in said chamber adapted to be raised when a predetermined current traverses said coil.

2. In a battery tester, an inclosing member, an iron core, a pole piece fastened therein, a contact piece secured to the pole piece having a chamber, a coil around the core having one terminal connected to the contact piece, and a plunger in said chamber adapted to be raised when a predetermined current traverses said coil.

3. In a battery tester, an inclosing member, an iron core having a longitudinal hole therein, a cap on said core, a pole piece adjustable through said cap and having a projection movable in the hole, a contact piece secured to the pole piece having a chamber, a coil around the core having one terminal connected to the contact piece, and a plunger in said chamber adapted to be raised when a predetermined current traverses said coil.

4. In a battery tester, an iron core, a contact piece secured thereto having a chamber, said core and chamber being threaded, a coil around the core having one terminal connected to the contact piece, and a plunger in said chamber adapted to be raised when a predetermined current traverses the coil.

5. In a battery tester, a solid iron core, a contact piece secured thereto having a chamber, threads on the core and the inner surface of the chamber for adjusting the depth of said chamber, a coil around the core having one terminal connected to the contact piece, plunger in said chamber adapted to be raised when a predetermined current traverses the coil.

6. In a battery tester, an iron core having a longitudinal hole therein, a contact piece having a chamber, a pole piece having a projection adapted to fit in said hole and a head adapted to fit in said chamber, co-acting threads on the core and in the chamber, threads on the head, also co-acting with said threads in the chamber, a coil on the core having one terminal connected to the contact piece, and a plunger in said chamber adapted to be raised when a predetermined current traverses the coil.

In testimony whereof, I hereunto affix my signature.

EMERSON L. CLARK.

Witnesses:
  IRA J. ADAMS,
  H. G. GROVER.